United States Patent [19]

Urushizaki et al.

[11] Patent Number: 4,894,997
[45] Date of Patent: Jan. 23, 1990

[54] METHOD OF STORING FRUITS AND VEGETABLES

[75] Inventors: Sueo Urushizaki, Tsukuba; Kazuhiko Ibe; Yutaka Matsumoto, both of Yokosuka; Kazuo Korehisa, Kamakura; Shinichi Yamada, Kiyokawa; Hitoshi Ozaki, Tokyo, all of Japan

[73] Assignees: Director General of National Institute of Agrobiological Resources, Tsukuba; Sumitomo Heavy Industries, Ltd., Tokyo, both of Japan

[21] Appl. No.: 193,912

[22] Filed: May 13, 1988

[30] Foreign Application Priority Data

May 18, 1987 [JP] Japan .............................. 62-118777
May 18, 1987 [JP] Japan .............................. 62-118778

[51] Int. Cl.⁴ ............................................... F24F 3/16
[52] U.S. Cl. ....................................... 62/78; 62/176.6; 426/419; 99/468
[58] Field of Search ................... 62/78, 89, 91, 176.6, 62/176.1, 176.4, 176.3; 236/44 R, 44 C, 44 B, 44 A; 426/418, 419, 312; 99/467, 468, 472, 473, 474

[56] References Cited

U.S. PATENT DOCUMENTS

| | | | |
|---|---|---|---|
| 3,102,777 | 9/1963 | Bedrosian et al. | 62/78 X |
| 3,415,310 | 12/1968 | Kuhlmann | 62/78 X |
| 3,958,028 | 5/1976 | Burg | 426/418 |
| 4,055,931 | 11/1977 | Myers | 426/419 X |
| 4,061,483 | 12/1977 | Burg | 62/268 |
| 4,566,282 | 1/1986 | Knoblauch et al. | 62/78 X |

FOREIGN PATENT DOCUMENTS 57-4298 1/1982 Japan .
59-88041 5/1984 Japan .

*Primary Examiner*—Harry B. Tanner
*Attorney, Agent, or Firm*—Flynn, Thiel, Boutell & Tanis

[57] ABSTRACT

A storage method in which fruits and/or vegetables immediately after harvest are stored in a storage chamber which maintains controlled storage atmospheres having a total pressure of not lower than 400 Torr and below the atmospheric pressure (760 Torr), an oxygen partial pressure of about 15 to about 145 Torr, a carbon dioxide partial pressure of about 15 to about 115 Torr, a relative humidity of not lower than 90%, and a temperature ranging between 0° and 15° C.

6 Claims, 1 Drawing Sheet

METHOD OF STORING FRUITS AND VEGETABLES

BACKGROUND OF THE INVENTION

The present invention relates to an improvement in the method of storing agricultural products such as fruits and vegetables under controlled atmospheres. More particularly, the present invention is concerned with a method of storing agricultural products in an atmosphere which has a low oxygen level and a high carbon dioxide level and which is slightly subatmospheric.

Storage of fruits and vegatables is very important for enabling the supply to be adjusted in accordance with the daily fluctuation in the demand and for supplying consumers with such products even after the season of harvest.

Hitherto, various storage methods have been proposed and employed, such as controlled atmospheres (CA) storage method and reduced pressure storage method. Briefly, the controlled atmospheres storage method is to store fruits and/or vegetables in an atmosphere which is controlled to maintain a low oxygen content and a high carbon dioxide content, as well as a high relative humidity, and which is held at a temperature generally ranging between 0° C. and 15° C. More specifically, the storage atmosphere is adjusted to have a gaseous composition containing less than 20% of oxygen and 1 to 10% of carbon dioxide, with the relative humidity maintained at 80% or higher. In general, the gaseous composition is determined to be optimum for the types of the product or products to be stored. Various methods have been proposed for attaining the low oxygen content and high carbon dioxide content of the storage atmosphere. One of such methods relies upon the respiration of the product stored in a storage chamber such that the oxygen is consumed and carbon dioxide is generated as a result of the respiration, so as to establish the controlled atmospheres. This method, however, is disadvantageous in that an impractically long time is required for the establishment of the controlled atmospheres. For instance, it takes 20 to 30 days for controlled atmospheres to be established in a storage chamber storing apples. In another method, the controlled atmospheres are established by making use of a gas which is produced by burning propane gas. This method also is complicated in that the burning of propane gas requires a specific caution to eliminate any danger, and in that an additional system has to be used for the purpose of removing excessive carbon dioxide in the storage chamber.

On the other hand, the reduced pressure storage method, which is disclosed in Japanese Patent Examined Publication No. 57-4298, is intended for long storage of agricultural products by promoting diffusion of ethylene and reducing the partial pressure of oxygen, through reducing the pressure in the storage chamber. In order to promote the diffusion of ethylene while reducing the oxygen partial pressure to a level effective for the long storage of agricultural products, it is necessary that the total pressure in the storage chamber has to be reduced to about 100 Torr or below. This in turn requires a strong storage chamber designed to be highly resistant to pressure. Such a chamber is generally heavy and; therefore, is not suitable for transportation.

Japanese Patent Unexamined Publication No. 59-88041 discloses a storage method which is a combination of the reduced pressure storage method and the controlled atmospheres storage method. According to this method, the pressure in the storage chamber is reduced so as to lower the partial pressure of oxygen, and a high carbon dioxide level is established by the carbon dioxide which is produced by the metabolism of fruits and vegetables. This method, however, suffers from the same disadvantage as that encountered with the reduced pressure storage method, because the pressure in this storage chamber is maintained between 20 and 200 Torr.

SUMMARY OF THE INVENTION

Accordingly, an object of the present invention is to provide an improved method of storing fruits and vegetables in an atmosphere which is controlled to have a low oxygen content and a high carbon dioxide content and which is slightly subatmospheric.

To this end, according to the present invention, there is provided a method of storing fruits and vegetables in a storage chamber which holds an atmosphere having a total pressure of not lower than 400 Torr and below the atmospheric pressure (760 Torr), preferably between 560 and 700 Torr, an oxygen partial pressure of about 15 to 145 Torr, a carbon dioxide partial pressure of about 15 to 115 Torr, and a relative humidity not lower than 90%. In this method, air, carbon dioxide and, as required, nitrogen are continuously supplied into the storage chamber and gases are exhausted from the chamber at rates corresponding to the rates of supply, whereby the total pressure and the oxygen and carbon dioxide partial pressures are maintained in the above-specified ranges.

The above and other objects, features and advantages of the invention will become clear from the following description of the preferred embodiment when the same is read in conjunction with the accompanying drawings.

BRIEF DESCRIPTION OF THE DRAWINGS

The attached sole Figure is a flow diagram of an embodiment of the storage method in accordance with the present invention.

DESCRIPTION OF THE PREFERRED EMBODIMENT

Figure 1:
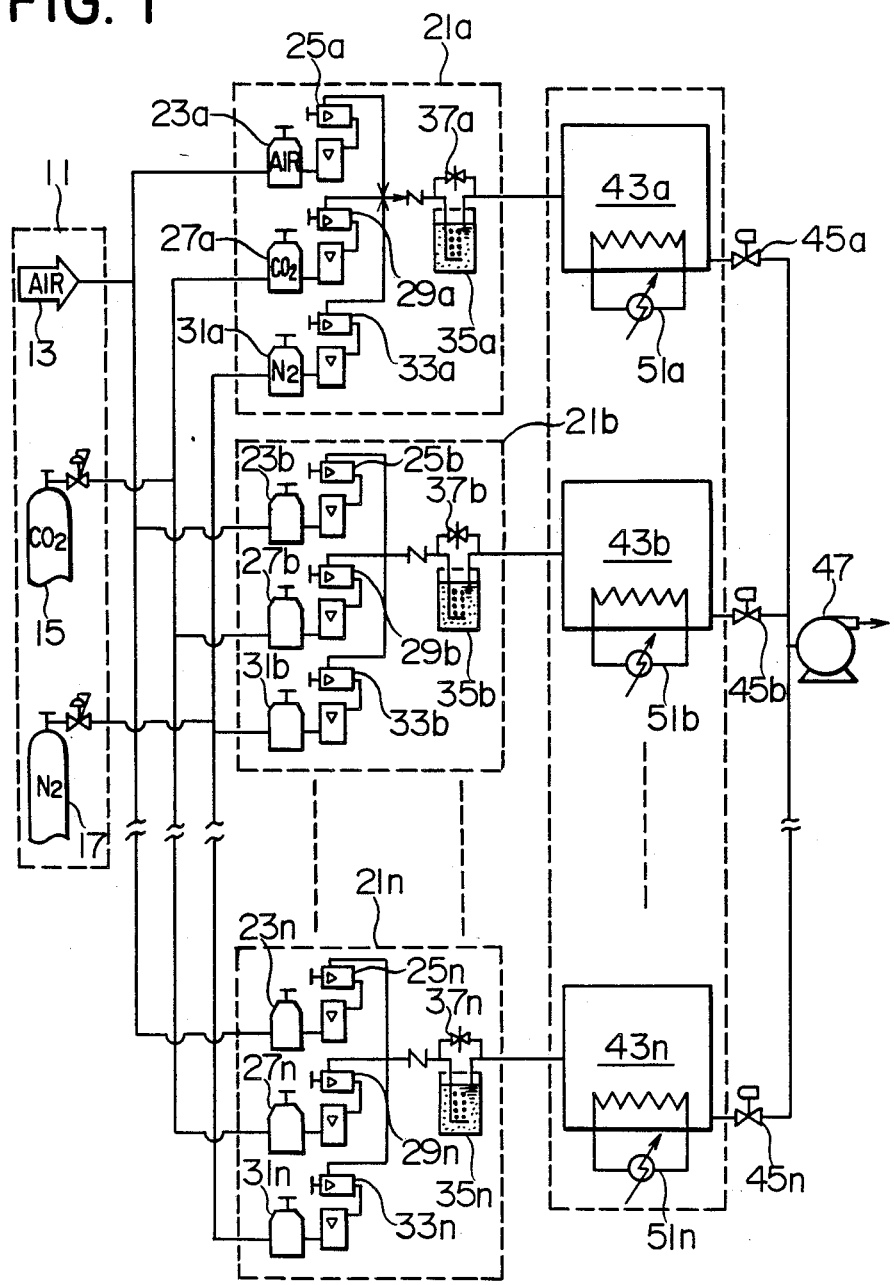

In the known controlled atmospheres storage method for storing fruits and vegetables, the interior of the storage chamber is maintained substantially at the same level as the atmospheric pressure. In contrast, the storage method of the present invention is characterized in that the controlled atmosphere in the storage chamber is maintained at a pressure slightly below the atmospheric pressure (referred to as "slightly subatmospheric pressure"), particularly at a presure not lower than 400 Torr and below the atmospheric pressure (760 Torr). The use of the slightly subatmospheric pressure provides an advantage that the requirement for the resistance to pressure of the storage chamber becomes less severe so that the storage chamber can be designed to have a reduced weight, thus facilitating the transportation. Another advantage offered by the use of the subatmospheric pressure is that that ethylene generated from the fruits and vegetables can easily be expelled from the region around the fruits and vegetables, as compared with the known controlled atmospheres storage method. In the storage method of the present invention, the controlled atmospheres in the storage chamber storing fruits and vegetables, held at the slightly subatmospheric pressure, can be maintained by continuously supplying the storage chamber with air, carbon dioxide and, as required, nitrogen, while exhausting the storage gas from the chamber at a rate corresponding to the rate of supply of the gases mentioned above.

The following Table 1 shows conditions of the controlled atmospheres storage method and temperatures of the controlled atmospheres which are considered by those skilled in the art to be appropriate for the purpose of storing fruits and vegetables.

TABLE I

Recommended CA conditions for selected fruits and vegetables

| Commodity | Temp. range (°C.) | CA % $O_2$ | CA % $CO_2$ |
|---|---|---|---|
| Apple | 0–5 | 82–3 | 1–2 |
| Apricot | 0–5 | 2–3 | 2–3 |
| Cherry (sweet) | 0–5 | 3–10 | 10–12 |
| Fig | 0–5 | 5 | 15 |
| Kiwifruit | 0–5 | 2 | 5 |
| Nectarine | 0–5 | 1–2 | 5 |
| Peach | 0–5 | 1–2 | 5 |
| Pear | 0–5 | 2–3 | 0–1 |
| Persimmon | 0–5 | 3–5 | 5–8 |
| Plum and prune | 0–5 | 1–2 | 0–s |
| Strawberry | 0–5 | 10 | 15–20 |
| Avocado | 5–13 | 2–5 | 3–10 |
| Banana | 12–15 | 2–5 | 2–5 |
| Grapefruit | 10–15 | 3–10 | 5–10 |
| Lemon | 10–15 | 5 | 0–5 |
| Lime | 10–15 | 5 | 0–10 |
| Olive | 8–12 | 2–5 | 5–10 |
| Orange | 5–10 | 10 | 5 |
| Mango | 10–15 | 5 | 5 |
| Papaya | 10–15 | 5 | 10 |
| Pineapple | 10–15 | 5 | 10 |
| Artichokes | 0–5 | 2–3 | 3–5 |
| Asparagus | 0–5 | air | 5–10 |
| Beans, snap | 5–10 | 2–3 | 5–10 |
| Broccoli | — | 1–2 | 5–10 |
| Brussels sprouts | 0–5 | 1–2 | 5–7 |
| Cabbage | 0–5 | 3–5 | 5–7 |
| Cantaloupes | 3–7 | 3–5 | 10–15 |
| Cauliflower | 0–5 | 2–5 | 2–5 |
| Celery | 0–5 | 2–4 | 0 |
| Corn, sweet | 0–5 | 2–4 | 10–20 |
| Cucumbers | 8–12 | 3–5 | 0 |
| Honeydews | 10–12 | 3–5 | 0 |
| Leeks | 0–5 | 1–2 | 3–5 |
| Lettuce | 0–5 | 2–5 | |
| Mushrooms | 0–5 | air | 10–15 |
| Onions, green | 0–5 | 1–2 | 10–20 |
| Peppers, bell | 8–12 | 3–5 | |
| Peppers, chili | 8–12 | 3–5 | |
| Spinach | 0–5 | air | 10–20 |
| Tomatoes, partially-ripe | 8–12 | 3–5 | 0 |

As will be understood from Table 1 above, the gaseous compositions of the controlled atmospheres are preferably changed in accordance with the kinds of the fruits and vegetables to be stored. The method of the present invention makes it possible to establish, without requiring any specific device such as a gas burning system, the controlled atmospheres which are optimum for the storage of desired fruits and vegetables and which essentially have low oxygen level and high carbon dioxide level, by continuously supplying the storage chamber with air, carbon dioxide and, as desired, nitrogen, while exhausting the storage gas from the chamber at a rate corresponding to the rate of supply. For instance, when the storage chamber is designed to withstand a reduced internal pressure of 400 Torr, the internal pressure of the storage chamber is first reduced to 400 Torr and then carbon dioxide is introduced into the chamber to raise the internal pressure up to 450 Torr, so that controlled atmospheres having an oxygen content of about 19% and a carbon dioxide content of about 11% are established within the storage chamber. The initial air in the storage chamber may be partially substituted by nitrogen. By suitably selecting the proportion of the air to be substituted and the amount of carbon dioxide to be charged into the storage chamber, it is possible to obtain any desired carbon dioxide content and oxygen content of the controlled atmospheres within the storage chamber. Once the desired gaseous composition is obtained within the storage chamber, gases from an external air supply source, carbon dioxide supply source and the nitrogen supply source are mixed to form a gaseous mixture of the same composition as that of the atmospheres established in the storage chamber, and the thus formed gaseous mixture is continuously supplied into the storage chamber while the storage gas is continuously exhausted from the storage chamber at a rate corresponding to the rate of supply of the gaseous mixture.

Referring to the sole Figure attached to the specification, a plurality of storage chambers 43a, 43b, 43n are connected to a common vacuum pump 47 through pressure regulating valves 45a, 45b, . . . , 45n, respectively. The storage chambers 43a, 43b, . . . , 43n also are connected to a common atmosphere gas supply source 11 through respective gas-composition/pressure regulating means 21a, 21b, . . . , 21n. The atmosphere gas supply source 11 is composed of an air supply source 13, a carbon dioxide supply source 15 and, as desired, a nitrogen supply source 17, so that air, carbon dioxide and, as desired, nitrogen are supplied to each of the gas-composition/pressure regulating means 21a, 21b, . . . , 21n.

The gas-composition/pressure regulating means 21a is composed of an air pressure controller 23a, an air flow rate controller 25b, a carbon dioxide pressure controller 27a, a carbon dioxide flow rate controller 29a, a nitrogen pressure controller 31a, a nitrogen flow rate controller 33a, and a humidity controller 35a, which cooperate in realizing desired composition and pressure of the gaseous mixture of oxygen, carbon dioxide and nitrogen. The thus formed gaseous mixture having the desired composition and pressure is introduced into the storage chamber 43a after humidification performed by the humidity controller 35a. The water or moisture content to be supplied into the storage chamber is controllable by adjusting the opening degree of the valve 37a provided in a by-pass. According to another method of humidification, vapor is generated by a supersonic oscillator and the thus generated water vapor is made to accompany the gaseous mixture. It will be clear to those skilled in the art that the compositions, as well as levels of pressure and humidity of the gaseous mixtures to be fed to the other storage chambers 43b, . . . , 43n can be controlled in the same manner as that described above, by means of the respective gas-composition/pressure regulating means 21b, . . , 21n.

A description will be made hereinunder as to a practical case in which controlled atmosphere of the desired conditions is maintained in the storage chamber 43a by using air and carbon dioxide supply sources. As the first step, the storage chamber 43a is evacuated by a vacuum pump 47 until the internal pressure comes down to 400 Torr, and then carbon dioxide is introduced into the storage chamber until the internal pressure is raised to 450 Torr. In consequence, an oxygen partial pressure of 0.21×400 Torr and a carbon dioxide partial pressure of 50 Torr are established in the storage chamber 43a. Thus, controlled storage atmospheres having an oxygen content of about 18.6% and a carbon dioxide content of about 11% are established within the storage chamber. Thereafter, a gaseous mixture having a pressure of 450 Torr and an oxygen content of about 18.6% and carbon dioxide content of about 11% is formed by suitably operating the pressure gegulator 23a and flow rate regulator 25b for air and the presure regulator 27a and flow rate regulator 29a for carbon dioxide. The thus formed gaseous mixture is continuously supplied into the storage chamber 43a while the gas in this storage chamber is continuously exhausted by the vacuum pump 47 at the rate corresponding to the rate of supply of the gaseous mixture. In consequence, controlled atmospheres of a total pressure of 450 Torr and having an oxygen content of about 18.6% and a carbon dioxide content of about 11% are always maintained within the storage chamber 43a.

When the storage chamber 43a is designed to have a proof pressure corresponding to an internal pressure of 400 Torr, while a demand exists for maintaining a total pressure of 450 Torr within the storage chamber, it is not allowed to reduce the oxygen content to a level below about 18.6% and to increase the carbon dioxide content to a level above about 11%. A further reduction in the oxygen content or a further increase in the carbon dioxide content, however, can be effected without substantial difficulty, by using nitrogen in addition to air and carbon dioxide. For instance, the process of establishing the controlled storage atmospheres may be modified as follows. As the first step, half the amount of air initially residing in the storage chamber 43a is substituted by nitrogen, and then the interior of the storage chamber 43a is evacuated by the vacuum pump 47 until the internal pressure comes down to 400 Torr, followed by introduction of carbon dioxide into the chamber until the total pressure in the storage chamber is increased to 450 Torr. With this method, it is possible to establish controlled storage atmospheres having an oxygen content of about 9% and a carbon dioxide content of about 11% within the storage chamber 43a. Once this condition is established in the storage chamber 43a, a gaseous mixture having a pressure of 450 Torr and having an oxygen content of about 9% and a carbon dioxide content of about 11% is formed through a suitable control of the pressures and flow rates of air, carbon dioxide and nitrogen, in the same manner as that described before, and the thus formed gaseous mixture is continuously supplied into the storage chamber 43a while the storage gas is exhausted by the vacuum pump 47 from the storage chamber 43a at a rate corresponding to the rate of supply, whereby controlled storage atmospheres having a total pressure of 450 Torr and oxygen and carbon dioxide contents of about 9% and about 11%, respectively, are maintained within the storage chamber 43a. In an alternative, the total pressure is reduced to 450 Torr, instead of 400 Torr, and a gaseous mixture adjusted to have a desired composition is supplied into the storage chamber while the storage gas is exhausted by the vacuum pump from the storage chamber at a rate corresponding to the rate of supply of the gaseous mixture. It will be apparent to those skilled in the art that this alternative offers the same advantage as those derived from the described embodiment.

It will also be clear to those skilled in the art that optimally controlled storage atmospheres of slightly subatmospheric pressure may be established and maintained within the respective storage chambers 43b to 43n, according to the exactly same procedure employed in the case of the storage chamber 43a. In illustrated example, each of the storage chambers has its own gas-composition/pressure regulating means 21a,21b, .., 21n and cooler 51a,51b, . . . , 51n, so that the compositions, pressures and temperatures of the storage atmospheres in the respective storage chambers can be optimized for the types and degrees of maturing of products such as fruits and vegetables stored therein, independently of the conditions of other storage chambers.

As will be understood from the foregoing description, the method of the present invention offers the following advantages.

Firstly, the method of the invention enables a prompt expelling of ethylene from the region around the stored products as compared with conventional controlled atmospheres storing method under atmospheric pressure, by virtue of the employment of slightly subatmospheric controlled atmospheres, without impairing the advantages of the controlled atmospheres storage method. In addition, the storage chamber is required to withstand only a small force which corresponds to the difference between the atmospheric pressure and the internal pressure which is not lower than about 400 Torr, so that the requirement for the mechanical strength of the storage chamber becomes less severe. This makes it possible to apply the storage method of the invention not only to stationary storage chambers but also to mobile storage chambers which are intended for transportation of the products. It is also to be pointed out that the storage method of the present invention can be used for the purpose of storage of various foods other than agricultural products such as meats, fishes, grains, as well as storage of flowers and bulbs.

What is claimed is:

1. A method of storing fruits and/or vegetables immediately after harvest, which comprises the steps of placing said fruits and/or vegetables in an enclosed storage chamber containing a controlled atmosphere consisting of a mixture of gases comprising oxygen and carbon dioxide, said mixture of gases having a total pressure of not lower than 400 Torr and up to 700 Torr, an oxygen partial pressure of from about 15 Torr to about 145 Torr and a carbon dioxide partial pressure of about 15 Torr to about 115 Torr, maintaining the relative humidity of said mixture of gases at not lower than 90% and maintaining the temperature of the mixture of gases at from about 0 to 15° C., mixing air and carbon dioxide from external sources under controlled pressures and flow rates to prepare a gaseous feed mixture having the same pressure and the same oxygen and carbon dioxide partial pressures as said controlled atmosphere in said storage chamber, and continuously supplying said gaseous feed mixture into said storage chamber while simultaneously exhausting the controlled atmosphere from said storage chamber at the same rate as said gaseous feed mixture is fed into said storage chamber.

2. A method according to claim 1, which comprises placing fruits and/or vegetables into a plurality of said storage chambers, connecting each storage chamber to an external gas supply source common to all the storage chambers and regulating the gas composition and pressure of each of said gaseous feed mixtures fed into said storage chambers, applying a vacuum to each storage chamber with a common vacuum pump through respective pressure regulating valves for each storage chamber, whereby the total pressure, oxygen partial pressure, carbon dioxide partial pressure and the relative humidity of said controlled atmospheres in the respective storage chambers are controllable independently of other storage chambers.

3. A method according to claim 1 in which said mixture of gases has a total pressure of from 560 to 700 Torr.

4. A method of storing fruits and/or vegetables immediately after harvest, which comprises the steps of
placing said fruits and/or vegetables in an enclosed storage chamber containing a controlled atmosphere consisting of a mixture of gases comprising oxygen and carbon dioxide, said mixture of gases having a total pressure of not lower than 400 Torr and up to 700 Torr, an oxygen partial pressure of from about 15 Torr to about 145 Torr and a carbon dioxide partial pressure of about 15 Torr to about 115 Torr, maintaining the relative humidity of said mixture of gases at not lower than 90% and maintaining the temperature of the mixture of gases at from about 0 to 15° C., mixing air, carbon dioxide and nitrogen from external sources under controlled pressures and flow rates to prepare a gaseous feed mixture having the same pressure and the same oxygen and carbon dioxide partial pressures as said controlled atmosphere in said storage chamber, and continuously supplying said gaseous feed mixture into said storage chamber while simultaneously exhausting the controlled atmosphere from said storage chamber at the same rate as said gaseous feed mixture is fed into said storage chamber.

5. A method according to claim 4, which comprises placing fruits and/or vegetables into a plurality of said storage chambers, connecting each storage chamber to an external gas supply source common to all the storage chambers and regulating the gas composition and pressure of each of said gaseous feed mixtures fed into said storage chambers, applying a vacuum to each storage chamber with a common vacuum pump through respective pressure regulating valves for each storage chamber, whereby the total pressure, oxygen partial pressure, carbon dioxide partial pressure and the relative humidity of said controlled atmospheres in the respective storage chambers are controllable independently of other storage chambers.

6. A method of storing fruits and/or vegetables immediately after harvest, which comprises the steps of
filling an enclosed storage chamber with a controlled atmosphere consisting of a mixture of gases consisting of nitrogen, water vapor, oxygen and carbon dioxide, said mixture of gases having a total pressure of from 560 to 700 Torr, an oxygen partial pressure of from about 15 Torr to about 145 Torr and a carbon dioxide partial pressure of about 15 Torr to about 115 Torr, said mixture of gases having a relative humidity of not lower than 90% and a temperature of from 0 to 15° C.; then placing said fruits and/or vegetables in said enclosed storage chamber, then continuously feeding a gaseous feed mixture having the same pressure and the same oxygen and carbon dioxide contents as said controlled atmosphere from an external source of said gaseous feed mixture into said enclosed storage chamber, and simultaneously exhausting the controlled atmosphere from said enclosed storage chamber at the same rate as said gaseous feed mixture is fed into said enclosed storage chamber.

* * * * *